(12) United States Patent
Fang

(10) Patent No.: US 11,582,230 B2
(45) Date of Patent: Feb. 14, 2023

(54) DYNAMIC MAC ADDRESS CHANGE MECHANISM FOR WIRELESS COMMUNICATIONS

(71) Applicant: ZTE Corporation, Guangdong (CN)

(72) Inventor: Yonggang Fang, San Diego, CA (US)

(73) Assignee: ZTE Corporation, Guangdong (CN)

( * ) Notice: Subject to any disclaimer, the term of this patent is extended or adjusted under 35 U.S.C. 154(b) by 510 days.

(21) Appl. No.: 16/403,483

(22) Filed: May 3, 2019

(65) Prior Publication Data
US 2020/0351648 A1    Nov. 5, 2020

(51) Int. Cl.
*H04L 29/06* (2006.01)
*H04W 8/26* (2009.01)
(Continued)

(52) U.S. Cl.
CPC ...... *H04L 63/0876* (2013.01); *H04L 61/5038* (2022.05); *H04L 61/5046* (2022.05);
(Continued)

(58) Field of Classification Search
CPC ..... H04L 61/00; H04L 61/20; H04L 61/2038; H04L 61/2046; H04L 61/2076;
(Continued)

(56) References Cited

U.S. PATENT DOCUMENTS 7,367,046 B1 * 4/2008 Sukiman ........... H04L 29/12216
709/219

8,780,807 B2 * 7/2014 McCormack ....... H04L 61/5046
370/328
(Continued)

FOREIGN PATENT DOCUMENTS

| CN | 1852330 A | 10/2006 |
|---|---|---|
| CN | 105592177 A | 5/2016 |

(Continued)

OTHER PUBLICATIONS

International Search Report and Written Opinion for PCT/CN2020/088221, dated Jul. 29, 2020.
(Continued)

*Primary Examiner* — Boris D Grijalva Lobos
(74) *Attorney, Agent, or Firm* — Perkins Coie LLP

(57) ABSTRACT

Methods, systems, and devices relate to digital wireless communication, and more specifically, to techniques relating to dynamic change MAC address of the station for subsequent transmissions. In one exemplary aspect, a method of dynamic change MAC address includes specifying a MAC address change mode and a new MAC address to be used by the station. In another exemplary aspect, a method of dual MAC address change mode in the dynamic change MAC address mechanism includes separating the unchanged MAC address of the station from the changeable MAC address of the station, and keep the mapping between them. In another exemplary aspect, a method includes transmitting a MAC address change request message from the station (or the access point) to initiate the MAC address change procedure. In another exemplary aspect, a method includes receiving a MAC address change response message from the access point (or the station).

17 Claims, 13 Drawing Sheets

(51) Int. Cl.
*H04L 9/40* (2022.01)
*H04W 12/03* (2021.01)
*H04L 61/5038* (2022.01)
*H04L 61/5046* (2022.01)
*H04L 61/5076* (2022.01)
*H04L 101/622* (2022.01)

(52) U.S. Cl.
CPC ........... *H04L 61/5076* (2022.05); *H04W 8/26* (2013.01); *H04W 12/03* (2021.01); *H04L 2101/622* (2022.05)

(58) Field of Classification Search
CPC . H04L 61/6022; H04L 63/08; H04L 63/0876; H04W 8/26; H04W 12/03
See application file for complete search history.

(56) References Cited

U.S. PATENT DOCUMENTS

| | | | | |
|---|---|---|---|---|
| 2007/0280207 | A1* | 12/2007 | Shimizu | H04L 29/1233 370/353 |
| 2011/0066756 | A1* | 3/2011 | Kakumaru | H04L 61/2092 709/245 |
| 2016/0142393 | A1* | 5/2016 | Wang | H04L 63/029 726/7 |
| 2016/0302058 | A1* | 10/2016 | Mestanov | H04L 61/2076 |
| 2017/0012977 | A1* | 1/2017 | Li | H04L 63/0414 |

FOREIGN PATENT DOCUMENTS

| | | | |
|---|---|---|---|
| CN | 105991450 | A | 10/2016 |
| CN | 109246162 | A * | 1/2019 |
| WO | 2003/061203 | | 7/2003 |
| WO | 2003061203 | A | 7/2003 |

OTHER PUBLICATIONS

Intel Corporation Update of WLAN MAC address and supported WLAN bands 3GPP TSG-RAN2 Meeting #93bis R2-162452, Apr. 11-15, 2016.
Partial Search Report for co-pending EP Application No. 20802385.3, dated Dec. 21, 2022, 12 pages.

* cited by examiner

DYNAMIC MAC ADDRESS CHANGE MECHANISM FOR WIRELESS COMMUNICATIONS

BACKGROUND

This patent document is directed generally to wireless communications.

BACKGROUND

Wireless communication systems can include a network of one or more access points (APs) that communicate with one or more wireless stations (STAs). An AP may emit radio signals that carry management information, control information or user data to one or more STAs. A STA may transmit radio signals to an AP in the same frequency channel using a technique such as time division duplexing (TDD) or in a different frequency channel using a technique such as frequency division duplexing (FDD).

Institute of Electrical and Electronics Engineers (IEEE) 802.11 specifies a specification for a wireless local area network (WLAN) over radio channels in license-exempt or shared access frequency bands. The basic unit of a WLAN is a basic service set (BSS). An infrastructure BSS may include the BSS with stations through associating with an Access Point (AP) to connect to the wired network or Internet. In an infrastructure BSS, both an access point and a station may share the same frequency channel via using Carrier Sensing Multiple Access with Collision Avoidance (CSMA/CA) technology, a kind of TDD mechanism, for multiple access and data transmissions.

SUMMARY

This document discloses methods, systems, and devices related to digital wireless communication, and more specifically, to techniques related to dynamically change of a station's Medium Access Control (MAC) address to protect user device privacy from its MAC address being tracked.

In one exemplary aspect, a method of dynamic MAC address change mechanism for wireless communication is provided to support two types of MAC address change modes: single MAC address mode and dual MAC address mode.

In one exemplary embodiment, a method for single MAC address change mode is provided to use one MAC address for identity of the station, encryption and decryption of the user data in the transmissions.

In one exemplary embodiment, a method for dual MAC address mode is provided to separate the changeable MAC address in the MAC frame header from the unchanged MAC address which is used in the authentication and security key generation for the user data encryption and/or decryption. The changeable MAC address is shown in plain text in the MAC frame header. The unchangeable MAC address may not be shown in the MAC frame header in plain text during the association period of the STA with the AP, and is not changed as the changeable MAC address varies. Both changeable MAC address and unchanged MAC address can be used to identify the station.

In one exemplary embodiment, a method for dual MAC address mode includes a mechanism for the AP to maintain a mapping table between the changeable MAC address of the STA and the unchanged MAC address of the STA.

In one exemplary embodiment, a method for dual MAC address mode includes a mechanism for the STA to maintain a mapping table between the changeable MAC address of the STA and the unchanged MAC address of the STA.

In another exemplary aspect, a method of dynamic MAC address change mechanism for wireless communication is provided using the communications between the STA and the AP to change the MAC address of the STA to prevent from being tracked.

In one exemplary embodiment, a method of dynamic MAC address change mechanism includes transmitting a MAC address change request message and a MAC address change response message for 2-ways handshaking for non MAC address collision case.

In one exemplary embodiment, a method for MAC address change request and response message include the specified MAC address change mode and the encrypted MAC address of STA in the MAC Address Change Information Element.

In one exemplary embodiment, a method of dynamic MAC address change mechanism includes transmitting a MAC address change request message, a MAC address change response message and a MAC address change acknowledgment message for 3-ways handshaking to solve the MAC address collision during changing a MAC address of station.

The details of one or more implementations are set forth in the accompanying attachments, the drawings, and the description below. Other features will be apparent from the description and drawings, and from the claims.

DETAILED DESCRIPTION

Figure 1:
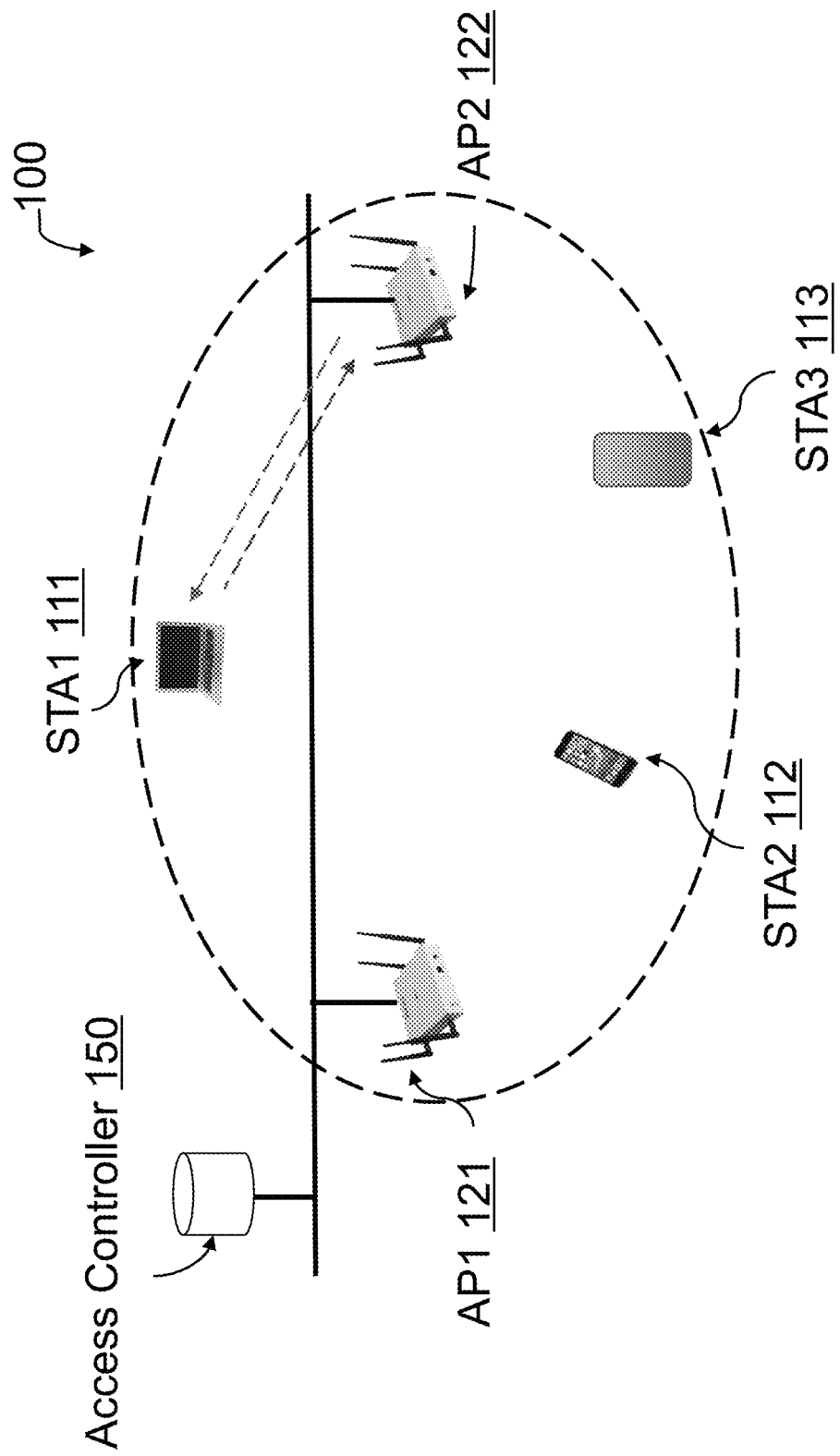
FIG. 1 illustrates an example infrastructure Basic Service Set (BSS) with stations.

Wireless local area communication is fast becoming a popular mechanism to communicate with each other directly or via a network such as the interne. Multiple wireless devices (e.g., smartphones, tablets, etc.) may attempt to transmit and receive data on a shared communication spectrum in an environment (e.g., airport, homes, buildings, sports venues, etc.). Additionally, wireless devices (e.g., sensors, cameras, control units, etc.) are increasingly utilized in networks for various applications (e.g., factory automations, vehicle communications etc.).

In some cases, transmission of data is based on an air interface as specified by the Institute of Electrical and Electronics Engineers (IEEE), standard 802.11 series. In this specification, devices may share a transmission medium that include a certain set of rules. In IEEE 802.11, the basic service set (BSS) is a building block of a Wireless Local Area Network (WLAN). Wireless stations (also called stations) associated in the radio coverage area may establish a BSS and provide the basic service of a WLAN.

According to IEEE802.11 specifications, the MAC address carried in the MAC frame header is used to identify a station, for ether transmitting or receiving the MAC packet. The MAC frame format may contain following one or more MAC addresses:

1) Receiving Address (RA): the address of the station which shall receive and process this MAC packet.

2) Transmitting Address (TA): the address of the station which transmits this MAC packet.

3) Destination Address (DA): the address of the destination station to receive this MAC packet.

4) Source Address (SA): the address of the original station transmitting this MAC packet.

Presently, MAC addresses carried in the MAC frame header are transmitted in plain text over the air interface. This allows the specified receiving station to respond the transmission. In addition, it allows all the other receiving stations in the coverage area to be able to identify the transmitting station and hold off (i.e. backoff) new transmissions to prevent from the collision to the ongoing transmission. The MAC address of the station sent in plain text over the air, however, might cause some privacy concerns if the MAC address would be used to identify a particular station and track the position of the user.

To address this privacy concern, the industry practices implement a mechanism called MAC address randomization, i.e. the station can randomly select a MAC address and use it for the association with the AP network. But such industry practices do not completely solve the privacy concern. A tracker could still use the randomized MAC address of the station to track the user's location.

In the existing industry practices, the MAC address randomization can be performed before the association procedure (i.e. pre-association). After associated with an AP, however, the STA may not be able to change its MAC address randomly by itself because the MAC address of the STA is bundled to the authentication and security key generation during the authentication and association procedures. If the MAC address of the STA was changed, it would cause a change of the station's encryption, and the user data in MAC frame would not able to be decrypted by the receiving station (i.e. the STA or the AP).

In addition, the MAC address randomization initialed by a STA in the industry practices may impact upper layer services, like WLAN access permission, billing, etc., since such services are bundled with the MAC address of the STA. When the MAC address of a STA is randomized, those service features would no longer work.

This patent document describes technique of dynamic changing MAC address of a station. In some embodiments, the change may be achieved using 2-ways or 3-ways handshaking with the associated access point.

The mechanism of dynamic MAC address change of station includes two modes:

(1) Single MAC Address Mode: The MAC address of station can be changed, but only one MAC address of STA is maintained and used at any time in this mode. Both AP and STA only keep the latest MAC address of STA for the communication, and use this MAC address to encrypt the user data for transmission or decrypt the received user data. The MAC address of a STA is used to identify the STA. The nearby STAs can use the MAC address of STA to set their network access vectors, or NAVs, to protect the ongoing transmission to be collided by new transmissions.

(2) Dual MAC Address Mode: The MAC address of station in this mode is separated into A) The unchanged MAC address is used for the encryption or decryption of the user data.

B) The changeable MAC address shown in the MAC frame header is transmitted in the plain text over the air.

In this way, the unchanged MAC address of station can still be used for the user data encryption or decryption based on IEEE802.11 specification, and allows to be bundled by the upper layer services, such as WLAN access permission, billing, etc. Therefore, it would reduce or eliminate impacts of MAC address change on the upper layer services.

The changeable MAC address of station, on the other hand, could be used for nearby stations to setup their NAVs to protect the ongoing transmission to be collided by new transmissions. In addition, it will make the station untrackable.

This patent document describes the mechanism for a station and an access point to use the dynamic MAC address change messages to specify a new MAC address of the station to be used in subsequent transmissions.

FIG. 1 illustrates an example infrastructure BSS. The infrastructure may include multiple stations STA1 (111), STA2 (112) and STA (113). Each station may be located in the coverage of a first access point AP1 (121) and a second access point AP2 (122), which form the infrastructure BSS: BSS1 and BSS2. Access Points AP1 (121) and AP2 (122) may be interconnected via a switch through a distribution system (DS) to form a multi infrastructure BSS (100) coordinated via an access controller (150). The access controller (150) may include a network function located at the gateway of any AP (121 or 122) in the BSS (100). In some embodiments, if the access controller (150) is located at the gateway of the DS, the access controller (150) may include a full MAC protocol stack or a partial MAC protocol stack.

In some embodiments, a station, e.g. STA1 (111), may communicate with an access point AP2 (122). As a station, e.g. STA2 (112), is in the same coverage area, it may be able to listen to the transmissions between the STA1 (111) and the AP2 (122). This allows the STA2 (112) to perform the virtual sensing on the media and set the NAV to prevent the collision into the ongoing transmission between the STA1 (111) and the AP2 (122) in the shared radio environment if their transmissions have been detected.

On the other hand, as the MAC address of STA1 (111) is transmitted over the air in plain text, any nearby STA, such as STA3 (113), can read the MAC address of STA1 (111) from the received MAC frame header. This may cause a privacy issue if the MAC address of the STA1 (111) is used to identify this particular station and track the location of the user.

To solve this privacy issue, this application provides a mechanism of dynamic MAC address change, which includes the two previously described MAC address change modes:

(1) Single MAC Address Mode: the MAC address of station can be changed, but only one MAC address of STA is used at any time to identify the STA, and encrypt or decrypt the user data from or to the STA.

(2) Dual MAC Address Mode: the MAC address of STA in is separated into

A) The unchanged MAC address: it is used for encryption or decryption of the user data. The unchanged MAC address is used in the authentication and association procedure, and bundled with the security key generation procedure specified by IEEE802.11 specification. This address of the station will not be changed during the entire association to the AP. It may not even be presented in the MAC frame header for identifying the STA after the changeable MAC address of the STA has been generated by the dynamic MAC address change mechanism.

B) The changeable MAC address: it is shown in the MAC frame header transmitted in plain text over the air. It is used to identify the station and set NAVs by other stations. The changeable MAC address of STA can be updated at any time using the dynamic MAC address change request and response messages, or other means.

In some embodiments of either Single MAC Address Mode or Dual MAC Address Mode, the AP2 (122) and the STA (111) use the dynamic MAC address change request and response (or acknowledgement when applicable) to specify the new MAC address of the STA (111) to be used for subsequent transmissions.

In some embodiments of the Dual MAC Address Mode, the AP2 (122) and the STA (111) maintain the mapping between the changeable and unchanged MAC addresses for the STA (111) since both changeable and unchanged MAC addresses can be used to identify the same station.

In some embodiments of the Dual MAC Address Mode, the AP2 (122) and the STA (111) use the unchanged MAC address of the STA (111) to encrypt or decrypt the user data of transmissions addressed to the changeable MAC address of the STA (111).

In some embodiments of the Dual MAC Address Mode, the AP2 (122) and the STA (111) identify the STA (111) via the changeable MAC address of the STA (111) in the MAC frame header of a MPDU transmitted in plain text over the air interface.

Figure 2:
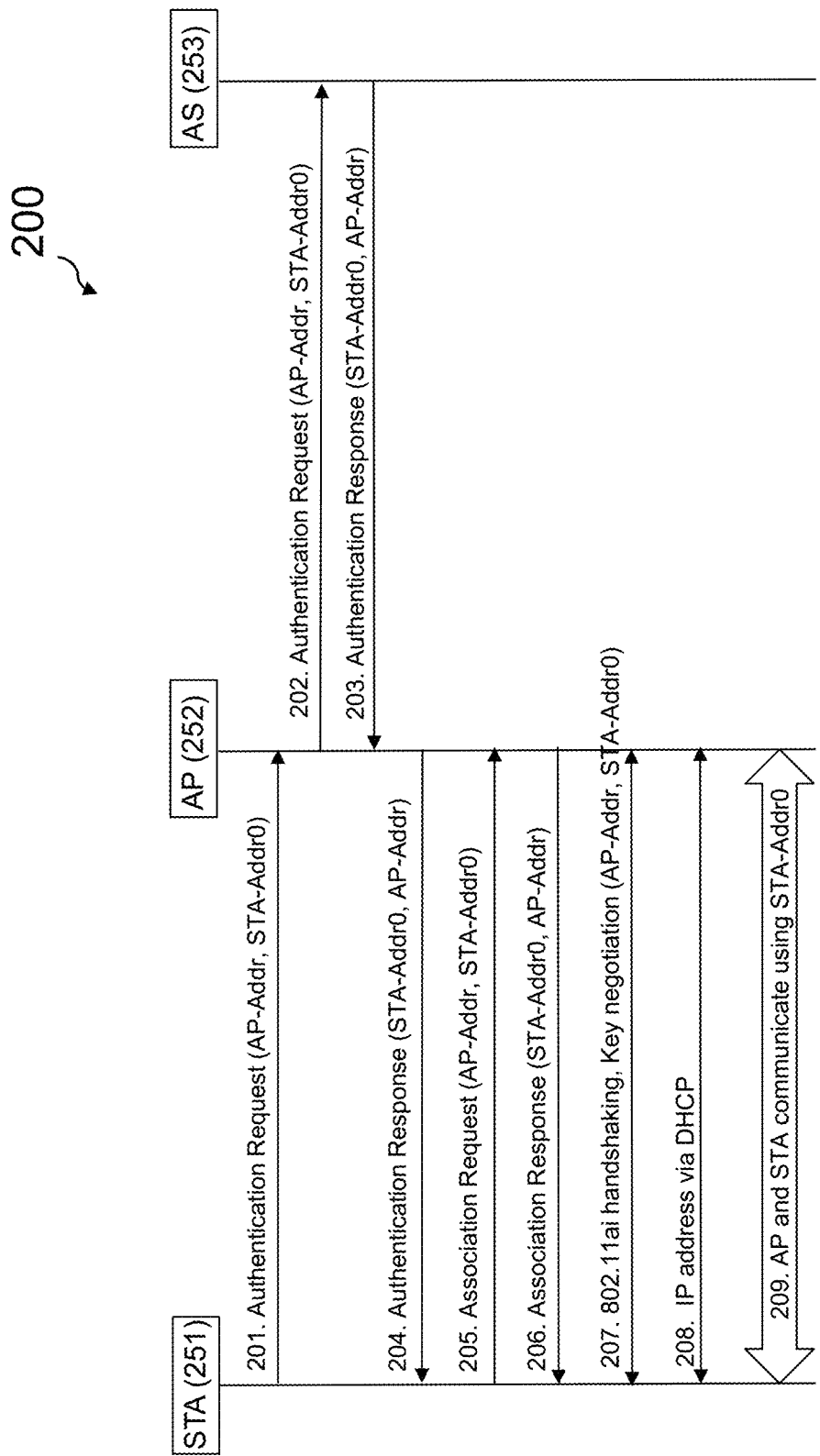
FIG. 2 illustrates an example signaling process of authentication for dynamic MAC address change mechanism.

FIG. 2 illustrates an example signaling process of authentication for dynamic MAC address change mechanism. In this example, the wireless local access network contains a STA (251), an AP (252) and an authentication server (253).

In step 201, the STA (251) sends an Authentication Request message to the AP (252) with RA=AP's MAC Address (i.e. AP-Addr), TA=STA's MAC address (i.e. STA-Addr0). The MAC address of the STA (251), i.e. STA-Addr0, may not be the same as the default value of MAC address assigned by the device manufacturer.

In step 202, after receiving the Authentication Request from the STA (251), the AP (252) forwards it to the AS (253).

In step 203, after authenticating the STA (251), the AS (253) sends the Authentication Response back to the AP (252).

In step 204, the AP (252) forwards the Authentication Response to the STA (251).

In step 205, the STA (251) sends the Association Request message to the AP (252) if the authentication succeeds.

In step 206, the AP (252) processes the Association Request message and sends the Association Response message back to the STA (251) if the AP (252) allows the association requested by the STA (251).

During the association, the STA (251) and the AP (252) may exchange their capability information of MAC address change mode support.

In step 207, the STA (251) and the AP (252) may perform handshaking and security negotiation specified by IEEE802.11ai. The STA (251) and the AP (252) may optionally negotiate the new MAC address of the STA (251) for subsequent transmissions.

In step 208, the AP (252) may assign an IP address to the STA (251) using DHCP protocol.

In step 209, the AP (252) can communicate with the STA (251) using its MAC address, i.e. STA-Addr0, until the new MAC address is generated by the dynamic MAC address change mechanism.

The AP (252) shall keep the MAC address of the STA (251), i.e. STA-Addr0, internally.

Figure 3A:
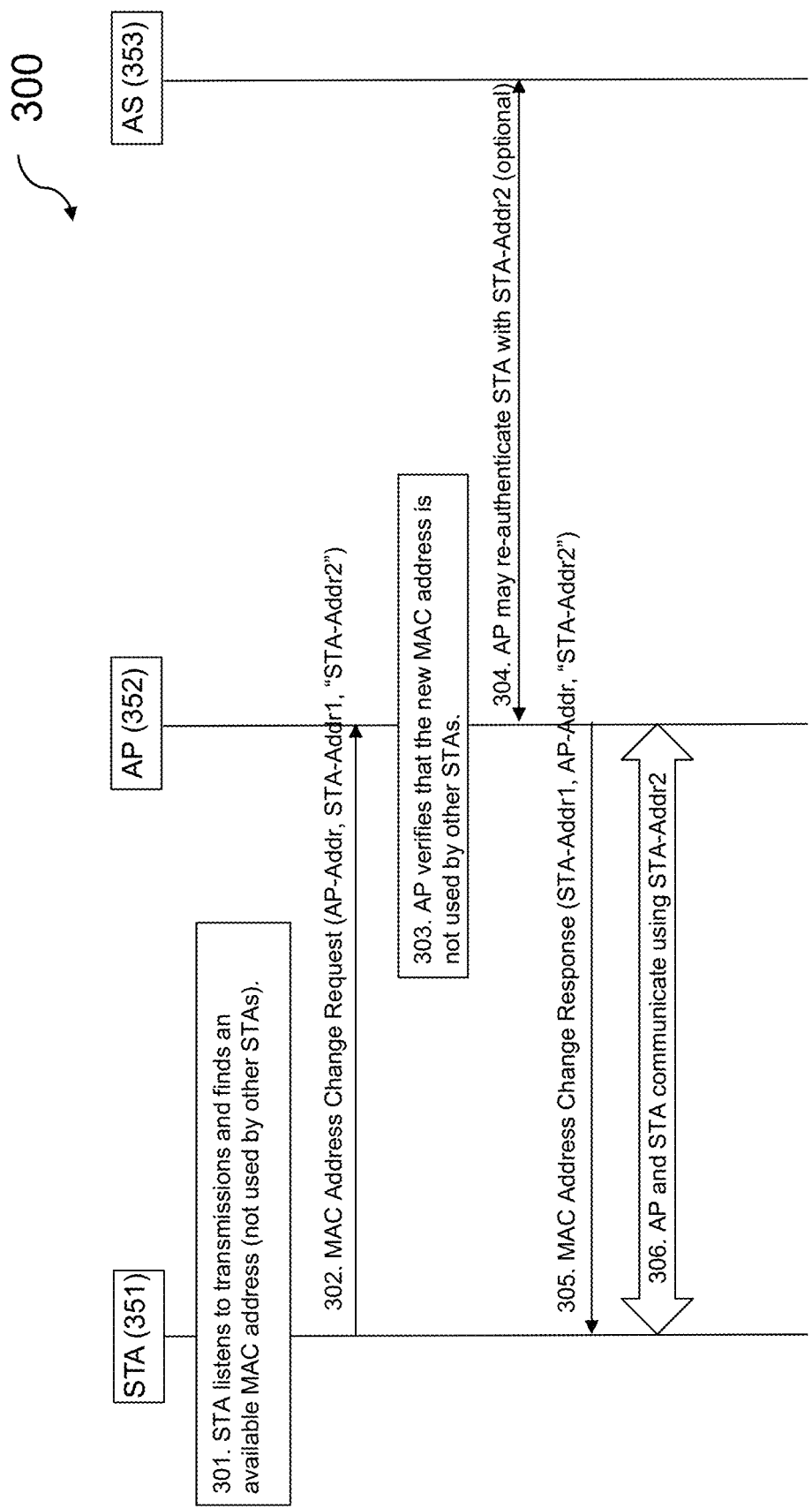
FIGS. 3A-3D illustrate examples for signaling process of the STA initiated MAC address change mechanism.

FIG. 3A illustrates an example signaling process 300 of STA initiated dynamic MAC address change mechanism for non MAC address collision case. The STA (351) and the AP (352) communicate with each other via the MAC address (i.e. MAC-Addr1) of the STA (351) and the MAC address (i.e. AP-Addr) of the AP (352).

The MAC address (i.e. MAC-Addr0) is the original MAC address of STA (351) used in the authentication and security key generation procedure. The MAC-Addr0 may be changed during the handshaking and security negotiation phase.

In Single MAC Address Mode, STA-Addr1 is the MAC address for the station identity and user data encryption/decryption.

In Dual MAC Address Mode, STA-Addr0 is the unchanged MAC address and STA-Addr1 is a changeable MAC address of the STA (351). Initially, the unchanged MAC address is same as the changeable MAC address if a changeable MAC address of the STA (351) has not been generated yet.

The AP (352) may broadcast the capability information of MAC address change mode support: either Single MAC Address Mode, or Dual MAC Address Mode, or both Single and Dual MAC Address Modes in a Beacon or Probe Response frame.

Based on the capability information of MAC address change mode support by the AP (352) and the capability of MAC address change mode itself, the STA (351) may choose and set one MAC Address Change Mode in the MAC Address Change Request message.

In step 301, the STA (351) listens to transmissions in the coverage area, and selects an available MAC address which is not used by other STAs. The STA (351) may initiate the MAC address change procedure at any time when it needs, e.g. the timer expiration after associating with the AP (352) using the current MAC address for a certain period, detecting its current MAC address being collided with another STA's MAC address, etc.

In step 302, the STA (351) sends a MAC Address Change Request message to the AP (352) with RA=the AP (352)'s MAC address (i.e. AP-Addr), TA=the MAC address (i.e. STA-Addr1) of the STA (351) for communicating with the AP (352) and the encrypted new MAC address (i.e. STA-Addr2) of the STA (351) carried in the MAC Address Change IE, which will be used to identify the STA (351) in future communication with the AP (352). The STA (351) set the MAC Address Change Mode (either Single or Dual MAC Address) in the MAC Address Change IE. When other STAs receive the MAC Address Change Request message, they can still treat it as a normal message and set the NAVs to prevent from a new transmission collided into the ongoing transmission. However a tracker receiving this message will not be able to relate STA-Addr1 to STA-Addr2 which will be used by the STA (351) in the future transmissions.

In step 303, after receiving the MAC Address Change Request message, the AP (352) verifies that the new MAC address (i.e. STA-Addr2) of the STA (351) is not being used by other STAs.

In step 304, the AP (352) may communicate to the Authentication Server (353) optionally to perform the re-authentication of the STA (351) with the new MAC address STA-Addr2.

In step 305, the AP (352) sends the MAC Address Change Response with RA=STA-Addr1, TA=AP-Addr and the encrypted new MAC address of the STA (351), i.e. STA-Addr2, carried in the MAC Address Change IE. The AP (352) shall replace the STA-Addr1 with the STA-Addr2 in the MAC frame header of MPDU in future transmissions with the STA (351).

For Dual MAC Address Mode, the AP (352) shall keep the mapping between STA-Addr0 and STA-Addr2 internally. After the MAC address change process is completed, both AP (352) and STA (351) shall use the STA-Addr0 for user data encryption or decryption on the MPDU addressed to STA-Addr2.

After receiving the MAC Address Change Response message, the STA (351) checks the MAC Address Change IE. If the MAC Address Info=STA-Addr2 which is proposed in the MAC Address Change Request, it then confirms completion of MAC address change procedure.

In step 306, the AP (352) uses STA-Addr2 in the MAC header of MPDU to communicate with the STA (351).

Figure 3B:
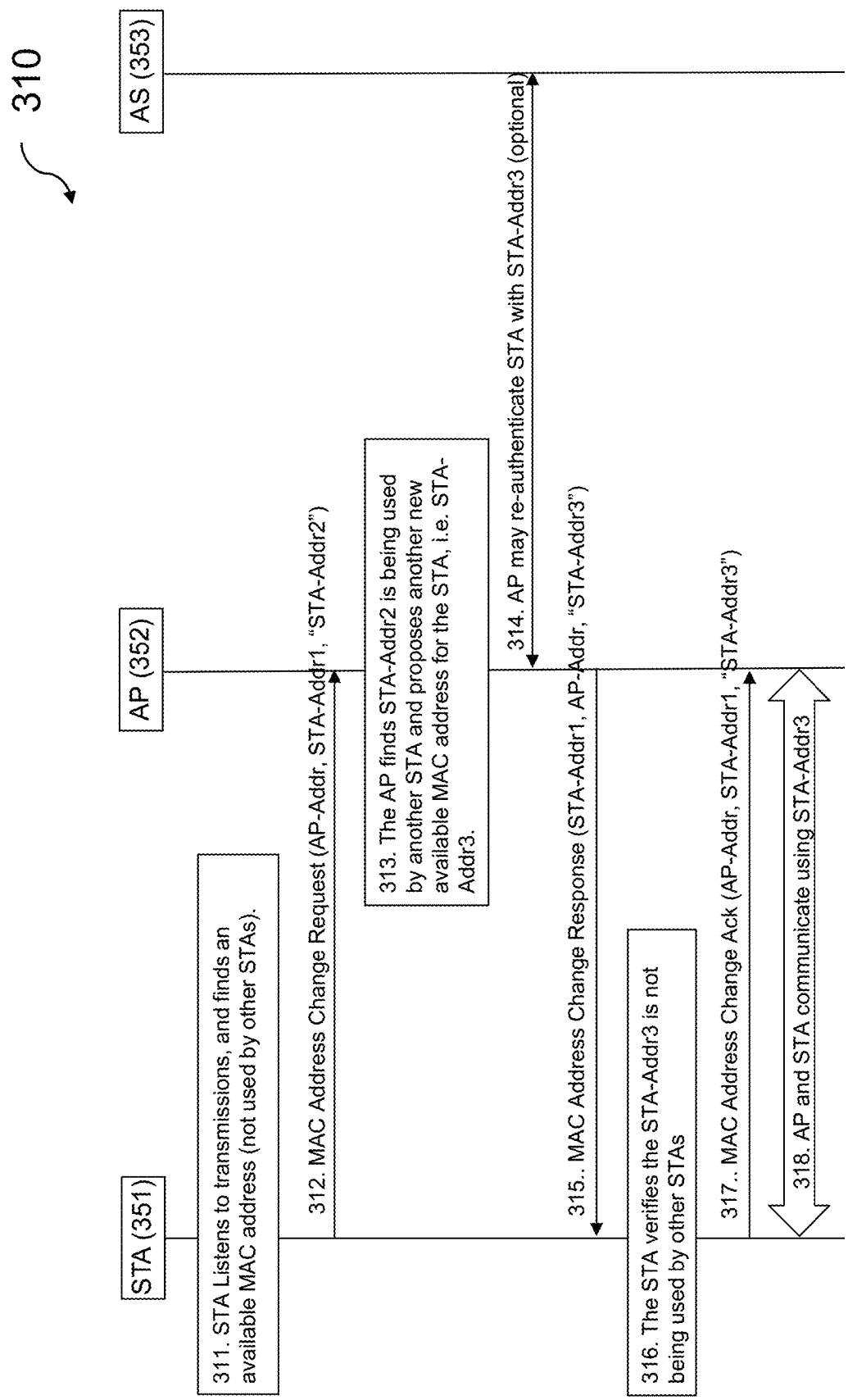

FIG. 3B illustrates another example signaling process 310 of STA initiated dynamic MAC address change mechanism for MAC address collision case. The STA (351) and the AP (352) communicate with each other via the MAC address (i.e. STA-Addr1) of the STA (351) and the MAC address (i.e. AP-Addr) of the AP (352).

In Single MAC Address Mode, STA-Addr1 is the MAC address for the station identity and user data encryption/decryption.

In Dual MAC Address Mode, STA-Addr0 is the unchanged MAC address and STA-Addr1 is a changeable MAC address of the STA (351). Initially, the unchanged MAC address is same as the changeable MAC address if a changeable MAC address of the STA has not been generated yet.

The AP (352) may broadcast the capability information of MAC address change mode support in a Beacon or Probe Response frame. Based on the capability information of MAC address change mode support by the AP (352) and the capability of MAC address change mode itself, the STA (351) may choose and set one MAC Address Change Mode in the MAC Address Change Request message.

In step 311, the STA (351) listens to transmissions in the coverage area, and selects an available MAC address which is not used by other STAs. The STA (351) may initiate the MAC address change procedure at any time when it needs, e.g. the timer expiration after associating with the AP (352) using the current MAC address for a certain period, detecting its current MAC address is collided with another STA's MAC address, etc.

In step 312, the STA (351) sends a MAC Address Change Request message to the AP (352) with RA=AP-Addr, TA=STA-Addr1 and the encrypted new MAC address (i.e. STA-Addr2) of the STA (351) carried in the MAC Address Change IE, which will be used to identify the STA (351) in future communication with the AP (352). The STA (351) set the MAC Address Change Mode in the MAC Address Change IE. When other STAs receive the MAC Address Change Request message, they can still treat it as a normal message and set the NAVs to prevent from a new transmission collided into the ongoing transmission. However a tracker receiving this message will not be able to relate STA-Addr1 to STA-Addr2 which will be used by the STA (351) in future transmissions.

In step 313, after receiving the MAC Address Change Request message, the AP (352) verifies that the new MAC address of the STA (351), but it finds STA-Addr2 is being used by another STA. Therefore the AP (352) proposes another new MAC address, i.e. STA-Addr3, for the STA (351) in future communications.

In step 314, the AP (352) may communicate to the Authentication Server (353) optionally to perform the re-authentication of the STA (351) with the new MAC address STA-Addr3.

In step 315, the AP (352) sends a MAC Address Change Response message with RA=STA-Addr1, TA=AP-Addr and the encrypted new proposed MAC address for the STA (351), i.e. STA-Addr3, carried in the MAC Address Change IE.

After receiving the MAC Address Change Response message, the STA (351) checks the MAC Address Change IE. If the MAC Address Info is not same as the STA-Addr2 which was proposed in the MAC Address Change Request message, it then verifies the new MAC address, i.e. STA-Addr3 is not being used by other STAs.

In step 317, the STA (351) sends a MAC Address Change Ack message with RA=AP-Addr, TA=STA-Addr1, and the encrypted new MAC Address, i.e. STA-Addr3, to confirm completion of MAC address change procedure.

After receiving the MAC Change Ack message, the AP (352) verifies that the MAC address in the MAC Address Info IE is the same as STA-Addr3.

For Dual MAC Address Mode, the AP (351) shall keep the mapping between STA-Addr0 and STA-Addr3 internally. The AP (352) and STA (351) shall use the STA-Addr0 for data encryption or decryption on the MPDU addressed to STA-Addr3.

In step 318, the AP (352) then uses STA-Addr3 in the MAC header of MPDU to communicate with the STA (351).

Figure 3C:
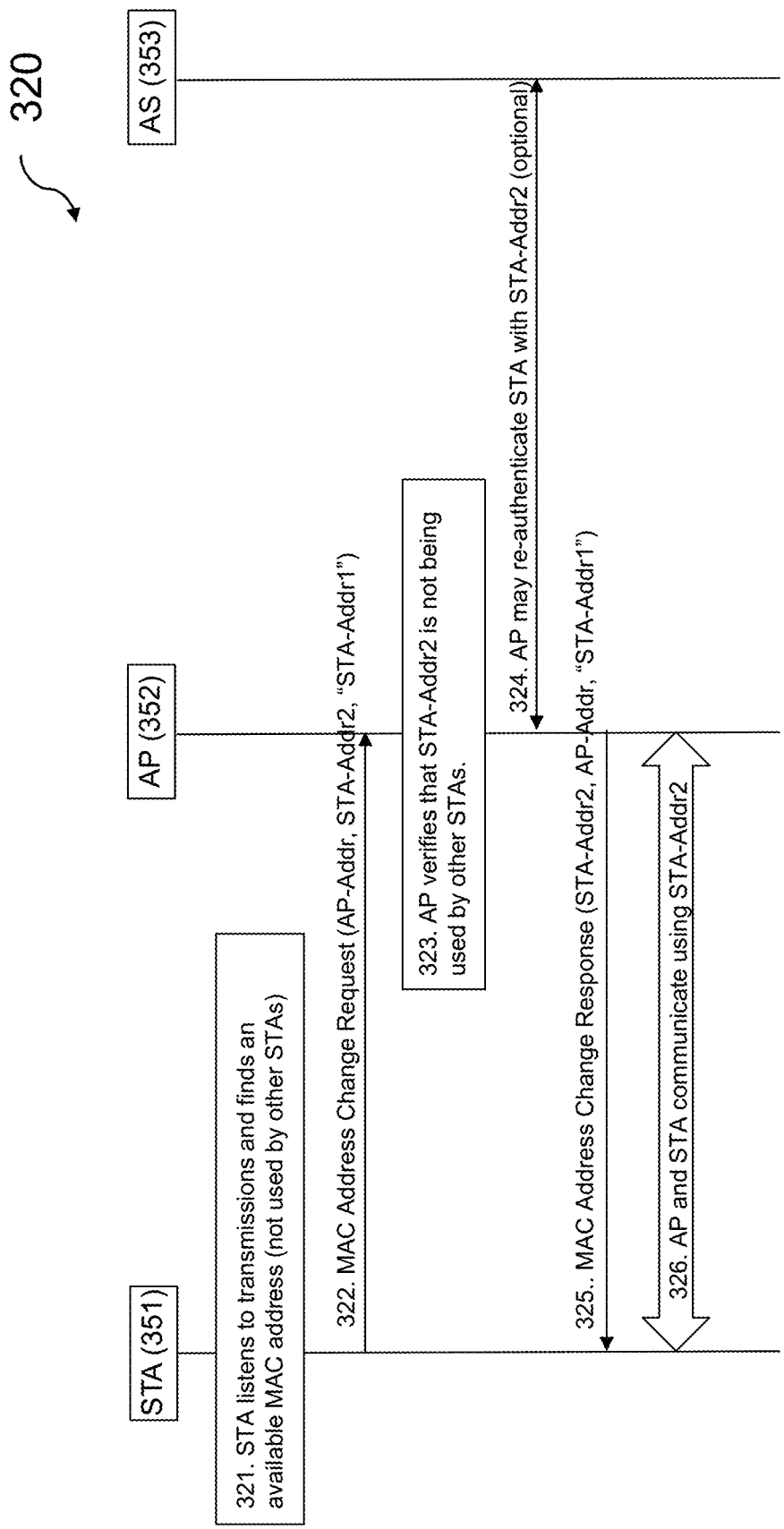

FIG. 3C illustrates another example signaling process 320 of STA initiated dynamic MAC address change mechanism for non MAC address collision case. The STA (351) and the AP (352) communicate with each other using the MAC address (i.e. MAC-Addr1) of the STA (351) and the MAC address (i.e. AP-Addr) of the AP (352).

In Single MAC Address Mode, STA-Addr1 is the MAC address for the station identity and user data encryption/decryption.

In Dual MAC Address Mode, STA-Addr0 is the unchanged MAC address of the STA (351) and STA-Addr1 is a changeable MAC address of the STA (351).

The AP (352) may broadcast the capability information of MAC address change mode support in a Beacon or Probe Response frame. Based on the capability information of MAC address change mode support by the AP (352) and the capability of MAC address change mode itself, the STA (351) may choose and set one MAC Address Change Mode in the MAC Address Change Request message.

In step 321, the STA (351) listens to transmissions in the coverage area, and selects an available MAC address which is not used by other STAs. The STA (351) may initiate the MAC address change procedure at any time when it needs, e.g. the timer expiration after associating with the AP (352) using the current MAC address for a certain period, detecting its current MAC address is collided with another STA's MAC address, etc.

In step 322, the STA (351) sends a MAC Address Change Request message to the AP (352) with RA=AP-Addr, TA=the new MAC address (i.e. STA-Addr2) of the STA (351) which will be used for the future communication with the AP (352), and the encrypted STA (351)'s MAC address (i.e. STA-Addr1) carried in the MAC Address Change IE. The STA (351) shall set a MAC Address Change Mode (either Single or Dual MAC Address) in the MAC Address Change IE. When other STAs receive the MAC Address Change Request message, they can still treat it as a normal message and set the NAVs to prevent from a new transmission collided into the ongoing transmission. However a tracker receiving this message will not be able to relate STA-Addr1 to STA-Addr2 which will be used by the STA (351) in the future transmissions.

In step 323, after receiving the MAC Address Change Request message, the AP (352) verifies STA-Addr2 not being used by other STAs.

In step 324, the AP (352) may communicate to the Authentication Server (353) optionally to perform the re-authentication of the STA (351) with the new MAC address STA-Addr2.

In step 325, the AP (352) sends the MAC Address Change Response with RA=STA-Addr2, TA=AP-Addr and the encrypted MAC address, i.e. STA-Addr1, carried in the MAC Address Change IE.

For Dual MAC Address Mode, the AP (351) shall keep the mapping between STA-Addr0 and STA-Addr2 internally. After the MAC address change process is completed, both AP (352) and STA (351) shall use the STA-Addr0 for encryption or decryption of user data in MPDU addressed to STA-Addr2.

After receiving the MAC Address Change Response message, the STA (351) checks the MAC address in the MAC Address Change IE. If the MAC Address Info is the same as STA-Addr1 which is sent in the MAC Address Change Request message, it confirms completion of MAC address change procedure.

In step 326, the AP (352) uses STA-Addr2 in the MAC header of MPDU to communicate with the STA (351).

Figure 3D:
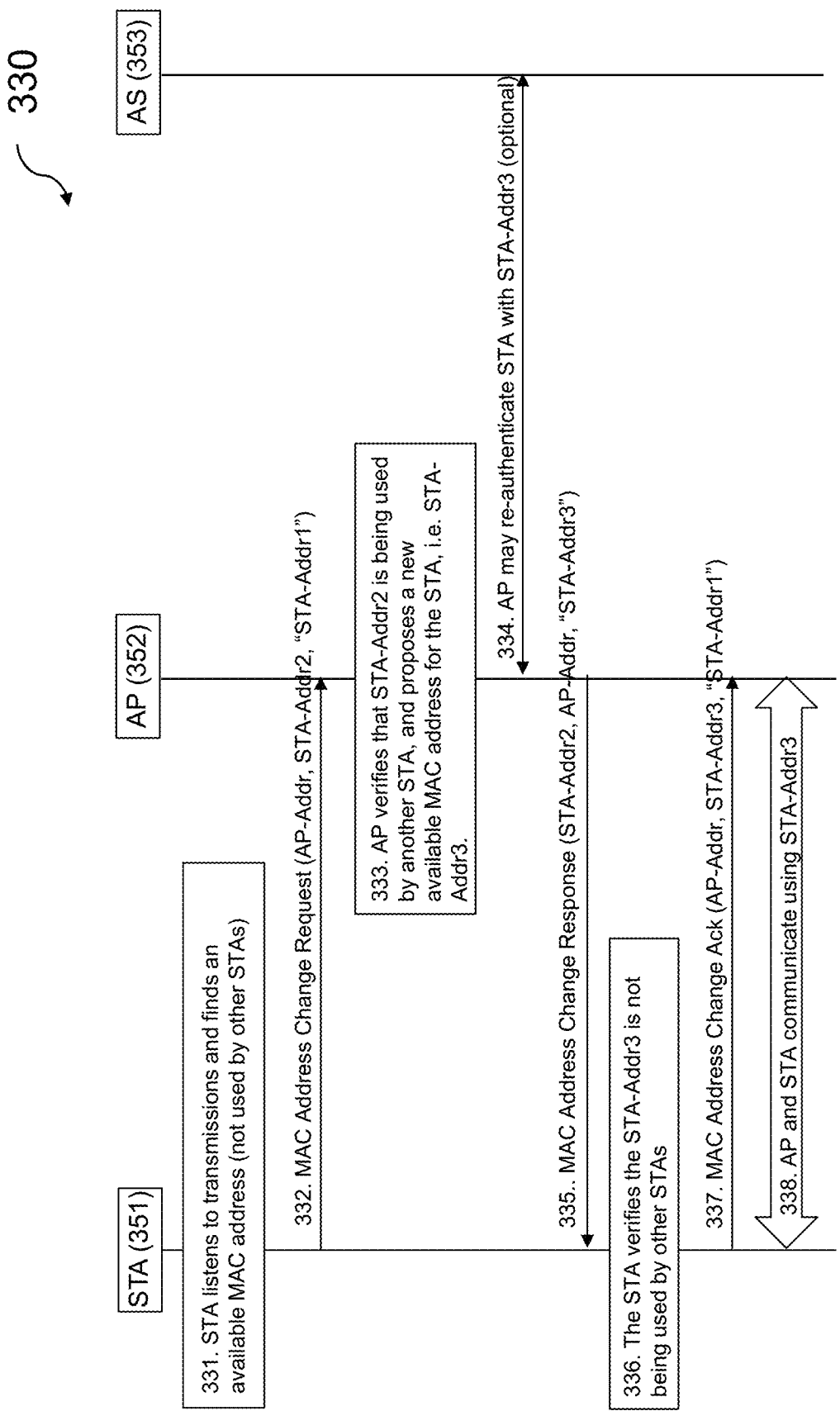

FIG. 3D illustrates another example signaling process 330 of STA initiated dynamic MAC address change mechanism for MAC address collision case. The STA (351) and the AP (352) communicate with each other via the MAC address (i.e. MAC-Addr1) of the STA (351) and the MAC address (i.e. AP-Addr) of the AP (352).

In Single MAC Address Mode, STA-Addr1 is the MAC address for the station identity and user data encryption/decryption.

In Dual MAC Address Mode, STA-Addr0 is the unchanged MAC address and STA-Addr1 is a changeable MAC address of the STA (351).

The AP (352) may broadcast the capability information of MAC address change mode support in a Beacon or Probe Response frame. Based on the capability information of MAC address change mode support by the AP (352) and the capability of MAC address change mode itself, the STA (351) may choose and set one MAC Address Change Mode in the MAC Address Change Request message.

In step 331, the STA (351) listens to transmissions in the coverage area, and selects an available MAC address which is not used by other STAs. The STA (351) may initiate the MAC address change procedure at any time when it needs, e.g. the timer expiration after associating with the AP (352) using the current MAC address for a certain period, detecting its current MAC address is collided with another STA's MAC address, etc.

In step 332, the STA (351) sends a MAC Address Change Request message to the AP (352) with RA=AP-Addr, TA=the new MAC address (i.e. STA-Addr2) of the STA (351) to be used for the future communication with the AP (352), and the encrypted STA (351)'s MAC address (STA-Addr1) carried in the MAC Address Change IE. The STA (351) shall set a MAC Address Change Mode in the MAC Address Change IE. When other STAs receive the MAC Address Change Request message, they can still treat it as a normal message and set the NAVs to prevent from a new transmission collided into the ongoing transmission. However a tracker receiving this message will not be able to relate STA-Addr1 to STA-Addr2 which will be used by the STA (351) in the future transmissions.

In step 333, after receiving the MAC Address Change Request message, the AP (352) verifies STA-Addr2 and finds that it is being used by another STA. The AP (352) proposed a new available MAC address, i.e. STA-Addr3, for the STA (351) in future communications.

In step 334, the AP (352) may communicate to the Authentication Server (353) optionally to perform the re-authentication of the STA (351) with the new MAC address, i.e. STA-Addr3.

In step 335, the AP (352) sends a MAC Address Change Response message with RA=STA-Addr2, TA=AP-Addr and the encrypted new proposed MAC address, i.e. STA-Addr3, carried in the MAC Address Change IE.

In step 336, after receiving the MAC Address Change Response message, the STA (351) checks the MAC address in the MAC Address Change IE and finds the MAC Address Info is not the same as STA-Addr1 in the MAC Address Change Request message. The STA (351) then verifies the new MAC address, i.e. STA-Addr3, not being used by other STAs.

The other station with the same collided MAC address, i.e. STA-Addr2, may receive this MAC Address Change Response message. But it cannot decrypt the MAC Address Change IE in the MAC Address Change Response message and/or may not be in the right protocol processing state for the MAC Address Change Response. Therefore it will discard the received MAC Address Change Response message.

In step 337, the STA (351) sends MAC Address Ack message with RA=AP-Addr, TA=STA-Addr3, and the encrypted MAC address, i.e. "STA-Addr1", in the MAC Address Change IE.

After receiving the MAC Address Change Ack message, the AP (352) verifies the STA-Addr3 is MAC address for the STA (351) in the MAC Address Change IE of the MAC Address Change Response message. It then confirms completion of MAC address change procedure.

For Dual MAC Address Mode, the AP (351) shall keep the mapping between STA-Addr0 and STA-Addr3 internally. The AP (352) and STA (351) shall use the STA-Addr0 for encryption or decryption of user data in MPDU addressed to STA-Addr3.

In step 338, the AP (352) uses STA-Addr3 in the MAC header of MPDU to communicate with the STA (351).

Figure 4A:
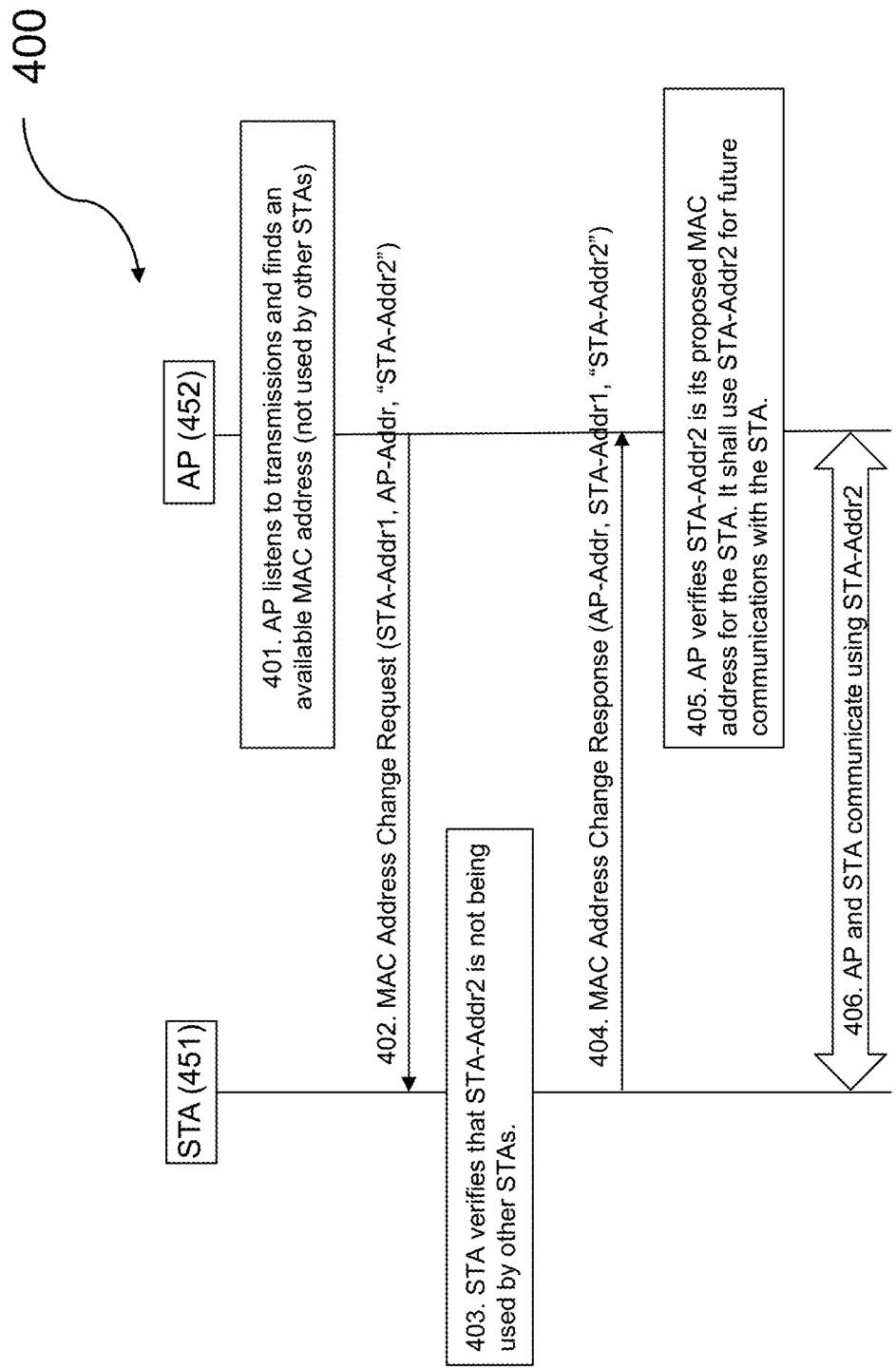
FIGS. 4A-4B illustrate examples for signaling process of the AP initiated MAC address change mechanism.

FIG. 4A illustrates an example signaling process 400 of AP initiated dynamic MAC address change mechanism for the non MAC address collision case. The STA (451) and the AP (452) communicate with each other using the MAC address (i.e. STA-Addr1) of the STA (451) and MAC address (i.e. AP-Addr) of the AP (452).

In Single MAC Address Mode, STA-Addr1 is the MAC address for the station identity and encryption/decryption.

In Dual MAC Address Mode, STA-Addr0 is the unchanged MAC address of the STA (351) and STA-Addr1 is the changeable MAC address of the STA (351). Initially, the changeable MAC address is same as the unchanged MAC address if the changeable MAC address of the STA has not been generated yet.

The AP (452) may acquire the capability information of MAC address change support by the STA (451) during the association process, and decide and set the MAC Address Change Mode, i.e. either Single MAC Address Mode or Dual MAC Address Mode, in the MAC Address Change Request message to be sent to the STA (451).

In step 401, the AP (452) listens to transmissions in the coverage area, and selects an available MAC address which is not used by other STAs. The AP (452) may initiate the MAC address change for the STA when it needs.

In step 402, the AP (452) sends a MAC Address Change Request message to the STA (451) with RA=the STA (451)'s MAC address (i.e. STA-Addr1), TA=AP (452)'s MAC address (i.e. AP-Addr) and the encrypted new MAC address (i.e. STA-Addr2) carried in the MAC Address Change IE for the STA (451) to use in future communication with the AP (452). The STA-Addr1 is the MAC address being used by the STA (451) carried in plain text of the MAC frame header. When other STAs receive the MAC Address Change Request message, they can still treat it as a normal message and set the NAVs to prevent from a new transmission collided into the ongoing transmission. However a tracker receiving this message will not be able to relate the STA-Addr1 to the STA-Addr2 which will be used by the STA (451) in future communications with the AP (452).

In step 403, after receiving the MAC Address Change Request message, the STA (451) verifies the STA-Addr2 is not being used by other STAs.

For Dual MAC Address Mode, the STA (451) shall keep the mapping between STA-Addr0 and STA-Addr2 internally. After the MAC address change process is completed, the STA (351) shall continue using the STA-Addr0 for data encryption or decryption on the MPDU addressed to STA-Addr2.

In step 404. The STA (451) sends the MAC Address Change Response message with RA=the AP (452)'s MAC address (i.e. AP-Addr), TA=the STA (451)'s MAC address (i.e. STA-Addr1) and the encrypted new MAC address (STA-Addr2) carried in MAC Address Change IE.

In step 405, once receiving the MAC Address Change Response message, the AP (452) verifies the STA-Addr2 is its proposed MAC for the STA (451). Then it is to confirm the completion of MAC address change procedure.

For Dual MAC Address Mode, the AP (452) shall keep the mapping between STA-Addr0 and STA-Addr2 for the STA (451) internally, and shall use the STA-Addr0 for data encryption or decryption on the MPDU addressed to STA-Addr2.

In step 406, the AP (452) will use the new MAC address (i.e. STA-Addr2) to continue communications with the STA (451).

Figure 4B:
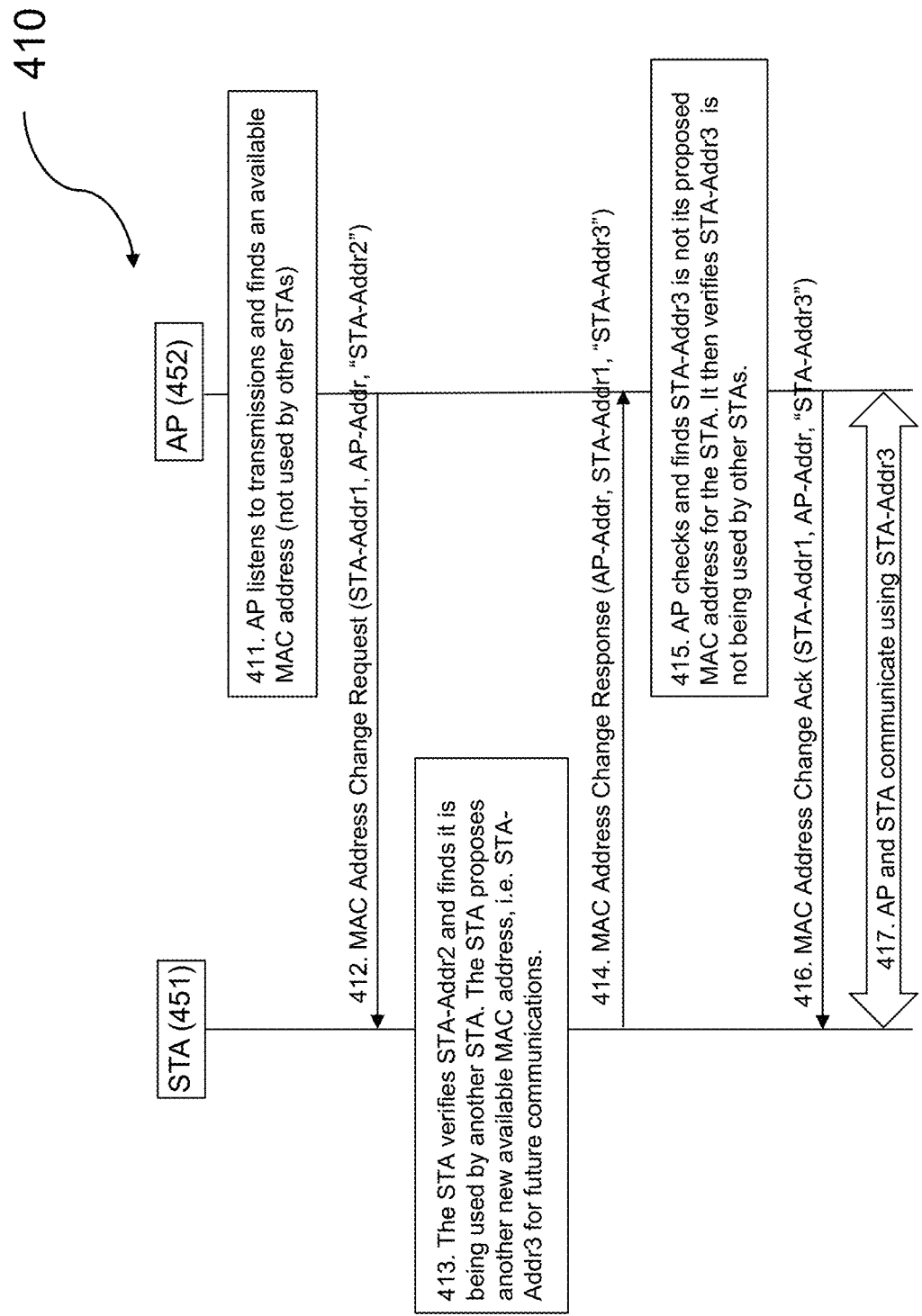

FIG. 4B illustrates another example signaling process 410 of AP initiated dynamic MAC address change mechanism for MAC address collision case. The STA (451) and the AP (452) communicate with each other using the MAC address (i.e. MAC-Addr1) of the STA (451) and MAC address (i.e. AP-Addr) of the AP (452).

In Single MAC Address Mode, STA-Addr1 is the MAC address for the station identity and encryption/decryption.

In Dual MAC Address Mode, STA-Addr0 is the unchanged MAC address of the STA (451) and STA-Addr1 is the changeable MAC address of the STA (451). Initially, the changeable MAC address is same as the unchanged MAC address if the changeable MAC address of the STA has not been generated yet.

The AP (452) may acquire the capability of MAC address change support by the STA (451) during the association process, and decide and set the MAC Address Change Mode, i.e. either Single MAC Address Mode or Dual MAC Address Mode, in the MAC Address Change Request message to be sent to the STA (451).

In step 411, the AP (452) listens to transmissions in the coverage area, and selects an available MAC address which is not used by other STAs. The AP may initiate the MAC address change for the STA when it needs.

In step 412, the AP (452) sends a MAC Address Change Request message to the STA (451) with RA=the STA (451)'s MAC address (i.e. STA-Addr1), TA=AP (452)'s MAC address (i.e. AP-Addr) and the encrypted new MAC address (i.e. STA-Addr2) carried in the MAC Address Change IE for the STA (451) to use in future communication with the AP (452). The STA-Addr1 is the MAC address being used by the STA (451) carried in plain text of the MAC frame header. When other STAs receive the MAC Address Change Request message, they can still treat it as a normal message and set the NAVs to prevent from a new transmission collided into the ongoing transmission. However a tracker receiving this message will not be able to relate the STA-Addr1 to the STA-Addr2 which will be used by STA (451) in future transmissions with the AP (452).

In step 413, after receiving the MAC Address Change Request message, the STA (451) verifies the STA-Addr2 and finds it is being used by another STA. The STA (451) then proposes another new MAC address for future communication with the AP (352).

In step 414. The STA (451) sends the MAC Address Change Response message with RA=the AP (452)'s MAC address (i.e. AP-Addr), TA=the STA (451)'s MAC address (i.e. STA-Addr1) and the encrypted new proposed MAC address (STA-Addr3) carried in the MAC Address Change IE.

In step 415, after receiving the MAC Address Change Response message, the AP (452) checks and finds the STA-Addr3 is not the same as its proposed MAC address for the STA (451), i.e. STA-Addr2. It then verifies the new proposed MAC address (STA-Addr3) by the STA (451) is not being used by other STAs.

For Dual MAC Address Mode, the AP (452) shall keep the mapping between STA-Addr0 and STA-Addr3 internally. After the MAC address change process is completed, the AP (452) shall use the STA-Addr0 for data encryption or decryption on the MPDU addressed to STA-Addr3.

In step 416, the AP (452) sends the MAC Address Change Ack message with RA=STA-Addr1, TA=AP-Addr, and the encrypted new MAC address for the STA (451), i.e. STA-Addr3.

After receiving the MAC Address Change Ack message, the STA (451) checks whether the MAC address in the MAC Address Change IE is the same as its proposed STA-Addr3. If yes, it confirms the completion of MAC address change procedure.

For Dual MAC Address Mode, the STA (451) shall keep the mapping between STA-Addr0 and STA-Addr3 internally and shall use the STA-Addr0 for data encryption or decryption on the MPDU addressed to STA-Addr3.

In step 417, the AP (452) will use the new MAC address (i.e. STA-Addr2) to communicate with the STA (451).

Figure 5:
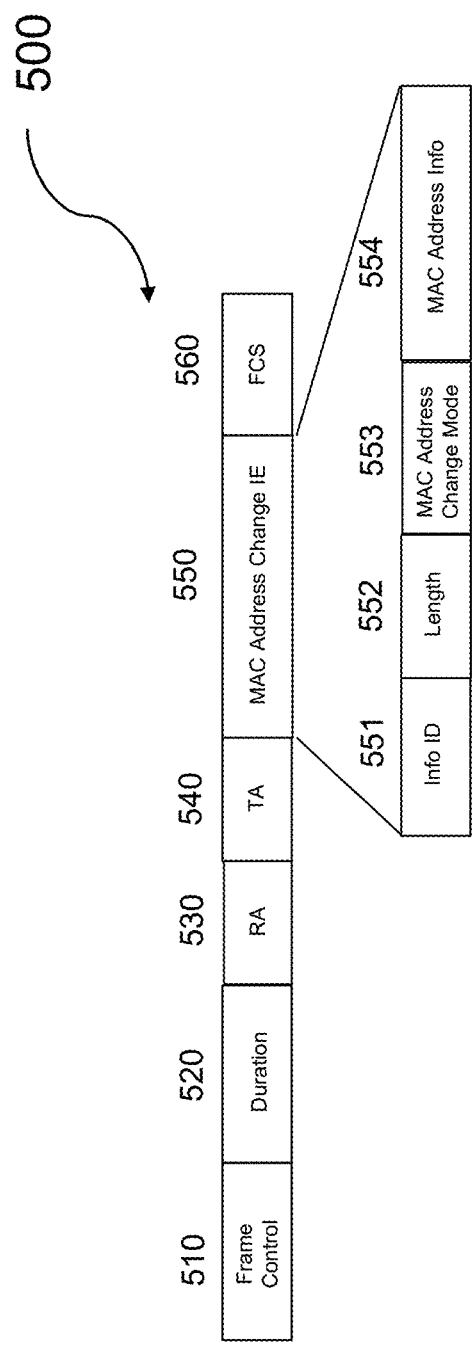
FIG. 5 illustrates an example MAC frame format for MAC Address Change Request, Response and Ack messages.

FIG. 5 illustrates an example MAC frame format 500 for MAC Address Change Request and Response messages.

Frame Control field (510): It provides the control information about this MAC frame. The first three subfields of the Frame Control field are Protocol Version, Type, and Subtype. The remaining subfields of the Frame Control field depend on the setting of the Type and Subtype subfields.

Duration field (520): it is 16 bits in length. The contents of this field vary with frame type and subtype, with whether the frame is transmitted during the contention free period, and with the QoS capabilities of the transmitting STA.

RA field (530): It is the MAC address of receiving STA.

TA field (540): It is the MAC address of transmitting STA.

MAC Address Change IE (550): It is the information element carrying the MAC address information which includes Info ID (551), Length (552) and MAC Address Mode (533), and MAC Address Info (554).

The MAC Address Change Mode (553) can be set to either Single MAC Address Mode or Dual MAC Address Mode in the MAC Address Change Request message for changing the MAC address of a station. Once it is set, the MAC Address Change Mode (553) in the MAC Address Change Response (or Ack) message shall also be set to the same Mode.

The MAC Address info (554) contains the encrypted MAC address of the STA which can be a new MAC address for the station or the current MAC address of the station.

FCS (560): The frame check sequence (FCS) is a field of CRC which is used for the receiving station to verify the received packet.

The Table 1 and 2 show the parameter setting of related MAC addresses for MAC Address Change Request and Response messages.

TABLE 1

MAC Address fields for MAC Address Change Request Message

| | STA Initiated MAC address change method (A) (B) | STA Initiated MAC address change method (C) (D) | AP Initiated MAC address change method (A) (B) |
|---|---|---|---|
| RA = | AP-Addr | AP-Addr | STA-Addr1 |
| TA = | STA-Addr1 | STA-Addr2 | AP-Addr |
| MAC Address Info (Encrypted) = | STA-Addr2 | STA-Addr1 | STA-Addr2 |

TABLE 2

MAC Address fields for MAC Address Change Response Message

| | STA Initiated MAC address change method (A) (B) | STA Initiated MAC address change method (C) (D) | AP Initiated MAC address change method (A) (B) |
|---|---|---|---|
| RA = | STA-Addr1 | STA-Addr2 | AP-Addr |
| TA = | AP-Addr | AP-Addr | STA-Addr1 |
| MAC Address Info (Encrypted) = | STA-Addr2 (A) STA-Addr3 (B) | STA-Addr1 (C) STA-Addr3 (D) | STA-Addr2 (A) STA-Addr3 (B) |

TABLE 3

MAC Address fields for MAC Address Change Ack Message

| | STA Initiated MAC address change method (B) | STA Initiated MAC address change method (D) | AP Initiated MAC address change method (A) |
|---|---|---|---|
| RA = | AP-Addr | AP-Addr | STA-Addr1 |
| TA = | STA-Addr1 | STA-Addr3 | AP-Addr |
| MAC Address Info (Encrypted) = | STA-Addr3 | STA-Addr1 | STA-Addr3 |

Figure 6:
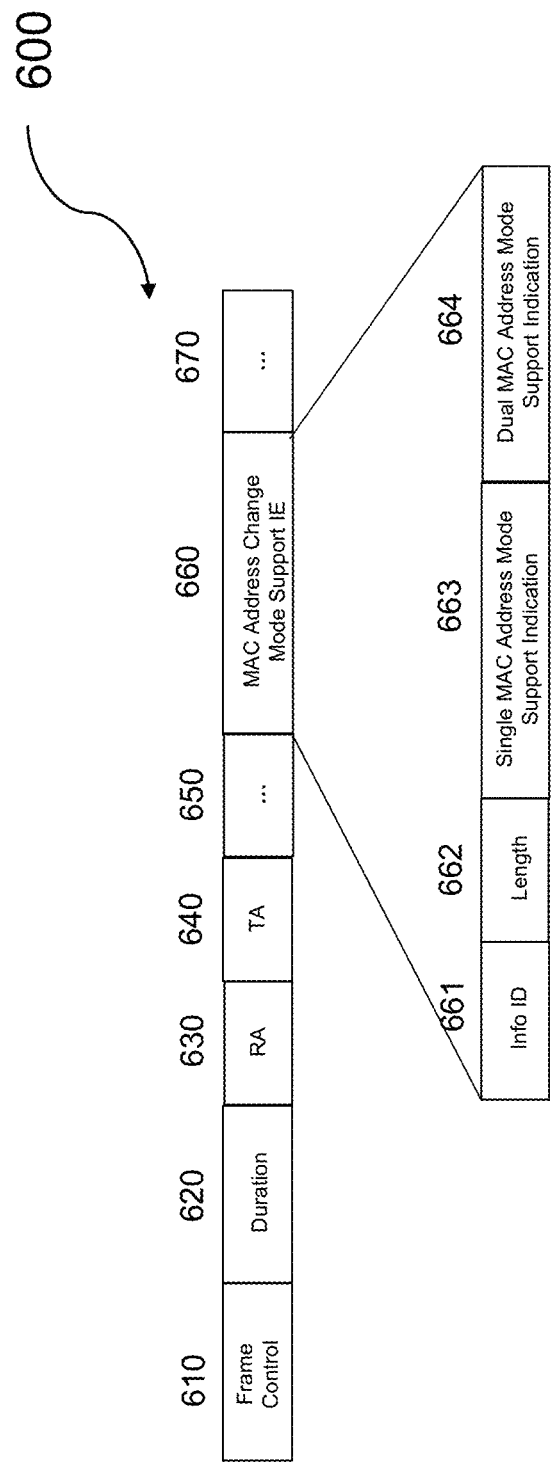
FIG. 6 illustrates an example MAC frame format of Beacon frame for capability information of MAC address change mode support.

FIG. 6 illustrates an example MAC frame format 600 of Beacon or Probe Response, or Capability Negotiation for MAC Address Change Mode support IE.

Frame Control field (610): It provides the control information about this MAC frame.

Duration field (620): it is 16 bits in length.

RA field (630): It is the MAC address of receiving station.

TA field (640): It is the MAC address of transmitting station.

MAC Address Change Mode Support IE (660): It is the information element carrying the MAC address change mode support which includes Info ID (661), Length (662) and Single MAC Address Mode Support Indication (663), and Dual MAC Address Mode Support Indication (664). If the Single MAC Address mechanism is supported, it shall set the Single MAC Address Mode Support Indication. If the Dual MAC Address mechanism is supported, it shall set the Dual MAC Address Mode Support Indication.

In one exemplary aspect, a method of dynamic changing MAC address of the station for subsequent transmissions for wireless communication includes support of two MAC address change modes, i.e. single MAC address mode and dual MAC address mode.

In some embodiments, the method for changing the MAC address of single MAC address mode of station includes using one dynamic MAC address to identify the station, encrypt and decrypt the user data of MAC frame addressed to the dynamic MAC address of the station.

In some embodiments, the method for changing the MAC address of dual MAC address mode of station includes separating the unchanged MAC address of the station from the changeable MAC address of the station, wherein the unchanged MAC address of the station is used for user data encryption or decryption, and changeable MAC address is used to identify the station transmitted in the MAC frame header in plain text.

In some embodiments, the method includes transmitting a MAC address change request message from the station (or the access point) to initiate the MAC address change procedure to specify the new MAC address of the station to be used in the subsequent transmissions between the station and the access point.

In some embodiments, the method includes receiving a MAC address change response message by the station (or access point) to confirm completion of the MAC address change procedure.

In some embodiments, the method includes transmitting a MAC address change response message from the station (or access point) with another new MAC address for the station in the case of collision in the new MAC address sent in the MAC address change request message.

In some embodiments, the method includes receiving a MAC address change acknowledgement by the station (or access point) to confirm completion of the MAC address change procedure.

In some embodiments, the method includes transmitting the specified MAC address change mode with the new MAC address of the station encrypted in the information element of the MAC address change request message so that the new MAC address of the station would not be able to relate to the current MAC address of the station in use sent by plain text over the air.

In some embodiments, the method includes transmitting the new MAC address of the station in plain text, but transmitting the specified MAC address change mode with the current MAC address of the station encrypted in the MAC address change information element. Therefore the new MAC address of the station even being sent in plain text would not be able to relate to the current MAC address of the station in use.

In another exemplary embodiment, a method of dual MAC address mode in the dynamic changing MAC address of station for subsequent transmissions includes keeping the mapping between the unchanged MAC address of the station and changeable MAC address of the station, where those mappings between the unchanged MAC address and changeable MAC address of the station shall be kept in both the access point and the station.

Figure 7:
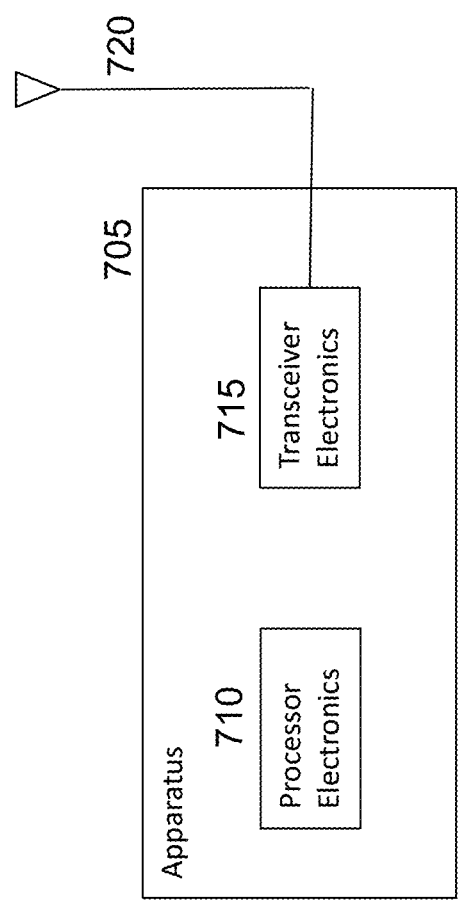
FIG. 7 is a block diagram of an example apparatus for implementing one or more methods described in the present document.

FIG. 7 is a block diagram representation of an example apparatus or hardware platform 705 that may be used for implanting one or more methods described in the present document. A hardware platform 705 such as a network device or a base station or an access point or a wireless device (e.g., STA) can include processor electronics 710 such as a microprocessor that implements one or more of the techniques presented in this document. The hardware platform 705 can include transceiver electronics 715 to send and/or receive wired or wireless signals over one or more communication interfaces such as antenna 720 and/or a wireline interface. The hardware platform 705 can implement other communication interfaces with defined protocols for transmitting and receiving data. The hardware platform 705 can include one or more memories (not explicitly shown) configured to store information such as data and/or instructions. In some implementations, the processor electronics 710 can include at least a portion of the transceiver electronics 615. In some embodiments, at least some of the disclosed techniques, modules or functions are implemented using the hardware platform 705.

Figure 8:
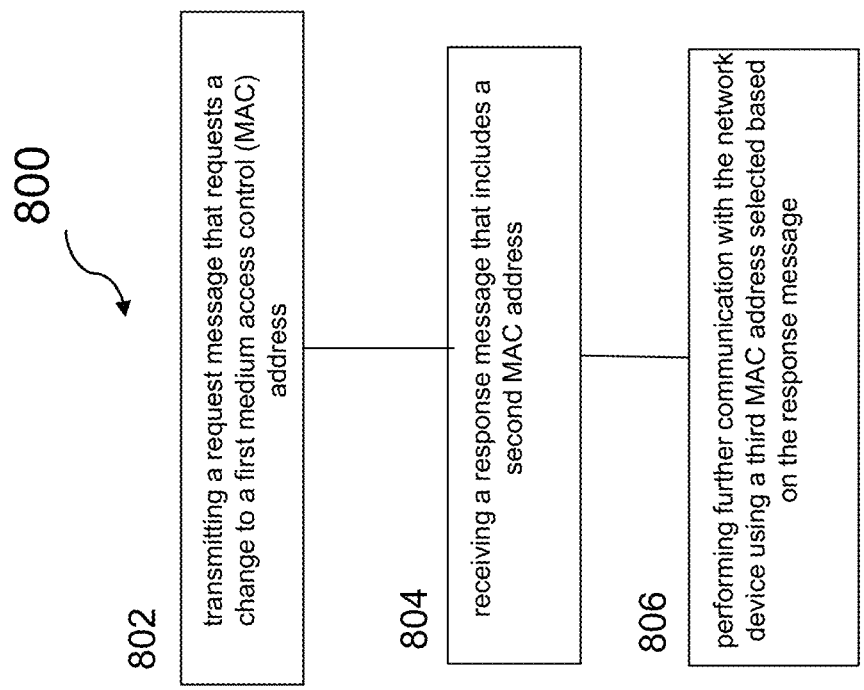
FIG. 8 is a flowchart for an example method of wireless communication.

FIG. 8 is a flowchart for an example method 800 of wireless communication. The method 800 may be implemented by a wireless device (e.g., STA 111, 112 or 113). The method 800 includes transmitting (802) a request message from a wireless device to a network device by which the wireless device requests a change to a first medium access control (MAC) address that is currently associated with the wireless device.

The method 800 includes receiving (804), by the wireless device from the network device, a response message that includes a second MAC address that the network device provides for use by the wireless device.

The method 800 includes performing (808) further communication with the network device using a third MAC address selected based on the response message.

Figure 9:
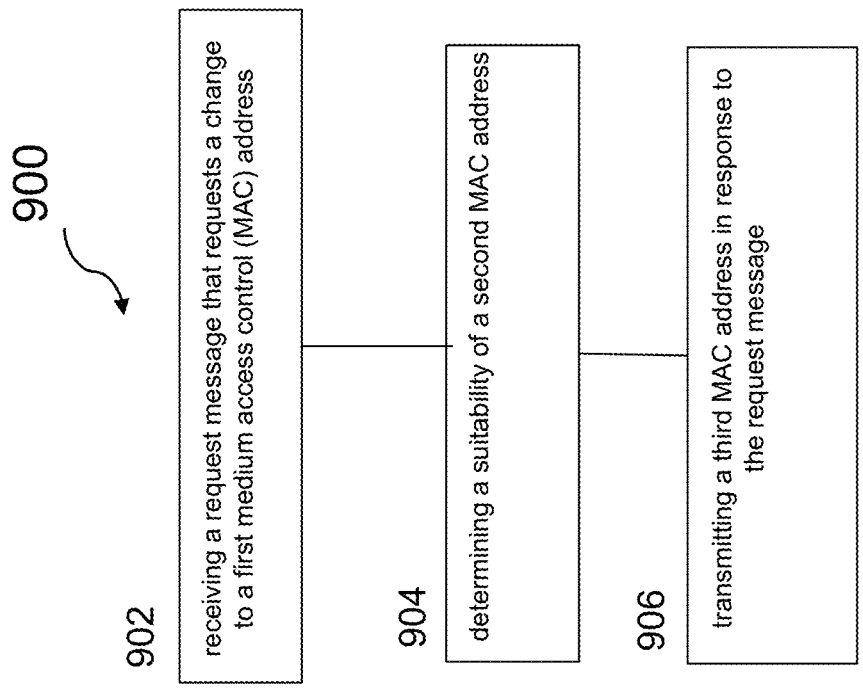
FIG. 9 is a flowchart for another example method of wireless communication.

FIG. 9 shows another method 900 of wireless communication. This method 900 may be implemented by a network device such as AP1 or AP2 depicted in FIG. 1. The method 900 includes receiving (902) a request message from a wireless device at a network device by which the wireless device requests a change to a first medium access control (MAC) address that is currently associated with the wireless device. The method 900 includes determining (904), based on the request message, a suitability of a second MAC address for the wireless device. The method 900 includes transmitting (906), based on the suitability, a third MAC address to the wireless device.

With respect to methods 800 and 900, as described in FIGS. 3A-3D, in some cases the first and second MAC addresses may be same.

In some embodiments, whether or not the third MAC address is same as the second MAC address may depend on whether or not the second MAC address is unique and not in use anywhere in the wireless network being served by the network device. The verification of uniqueness and availability of the second MAC address may be performed by the network device. For example, refers to steps 303, 304, 313, 314, 323, 324, 333, or 334.

Another method of wireless communication includes transmitting from a wireless device to a network device, a field indicating a capability of the wireless device for changing a medium access control (MAC) address of the wireless device using a single MAC address mode in which a single MAC address controls an identity of the wireless device and encryption and decryption of messages communicated with the network device and/or a dual MAC address mode in which a first MAC address controls the identity of the wireless device and a second MAC address, different from the first MAC address, controls the encryption and decryption of messages communicated with the network device. Examples of message formats are described with reference to FIGS. 5 and 6.

Another method of wireless communication includes receiving from a wireless device by a network device, a field indicating a capability of the wireless device for changing a medium access control (MAC) address of the wireless device using a single MAC address mode in which a single MAC address controls an identity of the wireless device and encryption and decryption of messages communicated with the network device and/or a dual MAC address mode in which a first MAC address controls the identity of the wireless device and a second MAC address, different from the first MAC address, controls the encryption and decryption of messages communicated with the network device and changing a currently used MAC address of the wireless device with a different MAC address by using the capability of the wireless device.

In methods 800 and 900, the STA initiates the change of MAC address. In some cases, as described with respect to FIGS. 4A-4B, the AP or the network device may initiate a MAC address change. For example, on method may include: transmitting a request message (e.g., 402 or 412), from a network device to a wireless device by which the network device requests a change to a first MAC address that is currently associated with the wireless device. The network device may include a second MAC address that is the candidate MAC address for the change. The method further includes, receiving, by the network device from the wireless device (e.g., 404 or 414) a response message that includes either the second MAC address (confirming the change) or a third MAC address (in case that the wireless device finds that the second MAC address is in use). Upon receiving the response message, the network device may send an acknowledgement in which the MAC address change is completed. Further communication may be carried out in single or dual MAC mode using the new MAC address.

From the wireless device perspective, the counterpart of the above method may include: receiving, at the wireless device, a request message from a network device by which the network device requests a change to a first MAC address currently associated with the wireless device, where the request includes a second MAC address that is a candidate address for the change, verifying, by the wireless device whether or not the second MAC address is in use by another wireless device, and transmitting, by the wireless device, a response message carrying a third MAC address (which may be same as the second MAC address, or different one suggested by the wireless device) to the network device. The method may further include the wireless device receiving an ACK from the network device, thereby completing the MAC address change.

In some embodiments, one or more of the methods described herein may be implemented by a wireless transmission apparatus comprising a processor (e.g., as depicted in FIG. 7) that is configured to carry out the method. In this context, the terms "transmitting" or "receiving" mean that the processor either controls the transceiver electronics to cause a waveform that includes the described messages to be transmitted or received or simply describes the baseband operation in which processor transmits or received digital information included in the corresponding transmitted or received signals.

Additional examples and aspects of the above described methods are also disclosed with reference to FIGS. 3A-3D and 4A-4B, and message formats shown in FIGS. 5-6.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
transmitting a request message from a wireless device to a network device by which the wireless device requests a change to a first medium access control (MAC) address that is currently associated with the wireless device;
receiving, by the wireless device from the network device, a response message that includes a second MAC address that the network device provides for use by the wireless device; and
performing further communication with the network device using a third MAC address selected based on the response message,
wherein, upon determining that the second MAC address is currently being used by another wireless device, the wireless device selects the third MAC address to be different from the second MAC address, and wherein the third MAC address is selected by: transmitting another request message to the network device including the third MAC address; and receiving a response from the network device that the third MAC address is okay for use.

2. The method of claim 1, wherein the first MAC address is same as the second MAC address.

3. The method of claim 1, wherein the wireless device selects the third MAC address to be same as the second MAC address in a case that the second MAC address is not currently being used by another wireless device.

4. The method of claim 1, wherein the request message includes the second MAC address in the request message.

5. A method for wireless communication, comprising:
receiving a request message from a wireless device at a network device by which the wireless device requests a change to a first medium access control (MAC) address that is currently associated with the wireless device;
determining, based on the request message, a suitability of a second MAC address for the wireless device;
transmitting, based on the suitability, a third MAC address to the wireless device,
wherein, upon determining that the second MAC address is currently being used by another wireless device, the wireless device selects the third MAC address to be different from the second MAC address, and wherein the third MAC address is selected by: transmitting another request message to the network device including the third MAC address; and receiving a response from the network device that the third MAC address is okay for use.

6. The method of claim 5 wherein the first MAC address is same as the second MAC address.

7. The method of claim 5, wherein the determining the suitability includes:
verifying that the second MAC address in not currently being used by another wireless device.

8. The method of claim 5, wherein the determining the suitability includes:
authenticating the second MAC address with an authentication server.

9. The method of claim 5, wherein the third MAC address is same as the second MAC address if the suitability passes and the third MAC address is different from the second MAC address if the suitability fails.

10. The method of claim 5, further including:
performing communication with the wireless device using the third MAC address.

11. A method for wireless communication, comprising:
transmitting from a wireless device to a network device, a field indicating a capability of the wireless device for changing a medium access control (MAC) address of the wireless device using at least one of a single MAC address mode in which a single MAC address controls an identity of the wireless device and encryption and decryption of messages communicated with the network device or a dual MAC address mode in which a first MAC address controls the identity of the wireless device and a second MAC address, different from the first MAC address, controls the encryption and decryption of messages communicated with the network device.

12. The method of claim 11, wherein a mapping between the first MAC address and the second MAC address is established using encrypted message exchange.

13. The method of claim 11, wherein the field is included in an information element in a MAC protocol data frame.

14. The method of claim 11, further including:
changing a currently used MAC address of the wireless device with a different MAC address by using the capability.

15. A method for wireless communication, comprising:
receiving from a wireless device by a network device, a field indicating a capability of the wireless device for changing a medium access control (MAC) address of the wireless device using at least one of a single MAC address mode in which a single MAC address controls an identity of the wireless device and encryption and decryption of messages communicated with the network device or a dual MAC address mode in which a first MAC address controls the identity of the wireless device and a second MAC address, different from the first MAC address, controls the encryption and decryption of messages communicated with the network device; and
changing a currently used MAC address of the wireless device with a different MAC address by using the capability of the wireless device.

16. The method of claim 15, wherein a mapping between the first MAC address and the second MAC address is established using encrypted message exchange.

17. The method of claim 15, wherein the field is included in an information element.

* * * * *